April 1, 1924.

F. SAVOIE

FISHING DEVICE

Filed March 28, 1923

1,488,838

Inventor

F. Savoie.

By

Lacy & Lacy, Attorneys

Patented Apr. 1, 1924.

1,488,838

UNITED STATES PATENT OFFICE.

FELIX SAVOIE, OF LOCKPORT, LOUISIANA.

FISHING DEVICE.

Application filed March 28, 1923. Serial No. 628,287.

*To all whom it may concern:*

Be it known that I, FELIX SAVOIE, citizen of the United States, residing at Lockport, in the parish of La Fourche and State of Louisiana, have invented certain new and useful Improvements in Fishing Devices, of which the following is a specification.

This invention relates to an improved fishing device and seeks, among other objects, to provide a device which, when baited and set, will automatically operate to catch a fish biting at the bait upon the line of the device.

The invention has as a further object to provide a device embodying a spring retracted pole and wherein the pull of a fish upon the line of the device will serve to release the pole for upward movement to hook the fish.

And the invention has a still further object, to provide a device wherein, when the device is sprung, an alarm will be sounded for apprising the fisherman of the catch.

Other and incidental objects will appear hereinafter.

Figure 2:
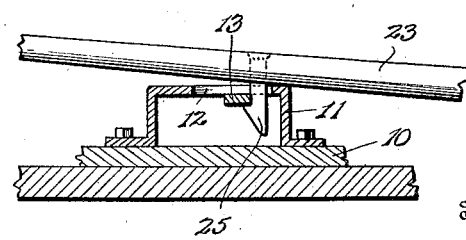
Figure 2 is an enlarged detail sectional view on the line 2—2 of Figure 1, looking in the direction of the arrows.
Figure 3:
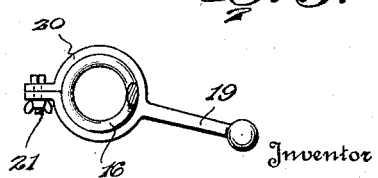
Figure 3 is an enlarged detail sectional view on the line 3—3 of Figure 1, looking in the direction of the arrows.

In carrying the invention into effect, I employ an oblong base 10 which may be formed of a suitable plank, and mounted upon the base at its forward end is a U-shaped bracket 11 suitably secured to the base and provided, as particularly shown in Figure 2, with a longitudinal slot 12. Pivoted at one end upon the base to extend beneath the bracket is a trigger lever 13 and appropriately secured to the base in spaced relation to the bracket is an angle plate or guide member 14 in which is formed a slot 15 freely accommodating the lever therethrough. Thus, the plate 14 will serve to guide and support the free end portion of the lever and will also function to limit the lever in its swinging movement in opposite directions. Secured at one end to the inner end portion of the lever is a spring 16, the opposite end of which is engaged with a stud or post 17 upstanding from the base 10 so that the spring will thus exert a rearward pull upon the lever, and mounted upon the base adjacent said spring is an appropriate bell or annunciator 18. Arranged upon the spring to strike the bell is a tapper 19 which, as shown in detail in Figure 3, is formed at its inner end with a split eye 20 encircling the spring and connecting the members of said eye is a clamping bolt 21 adjustable for binding the tapper upon the spring.

Mounted upon the base 10 in the rear of the bracket 11 is an upstanding eye bolt 22 and mounted upon said bolt is a pole 23 equipped at its inner end with an eye member 24 engaging through the eye of the bolt 22 pivotally mounting the pole. Depending from the inner end portion of the pole is a hook or catch 25 adapted to be freely received through the slot 12 of the bracket 11 and appropriately mounted upon the rear end portion of the base in alinement with the eye bolt 22 and bracket 11, is a post 26 anchoring a spring 27. Upstanding from the inner end portion of the pole 23 are longitudinally spaced eye bolts 28 with which the forward end of the spring may be selectively engaged for varying the leverage of the spring upon the pole. Thus, the spring will serve to normally hold the pole in elevated position. Mounted upon the pole at its outer end is a depending guide 29 in the rear of which is a somewhat longer laterally directed guide 30 and extending freely through said guides is a line 31 secured at its inner end to the free end of the lever 13. At its outer end the line will, of course, carry a sinker and may be equipped with any appropriate hook.

Figure 1:
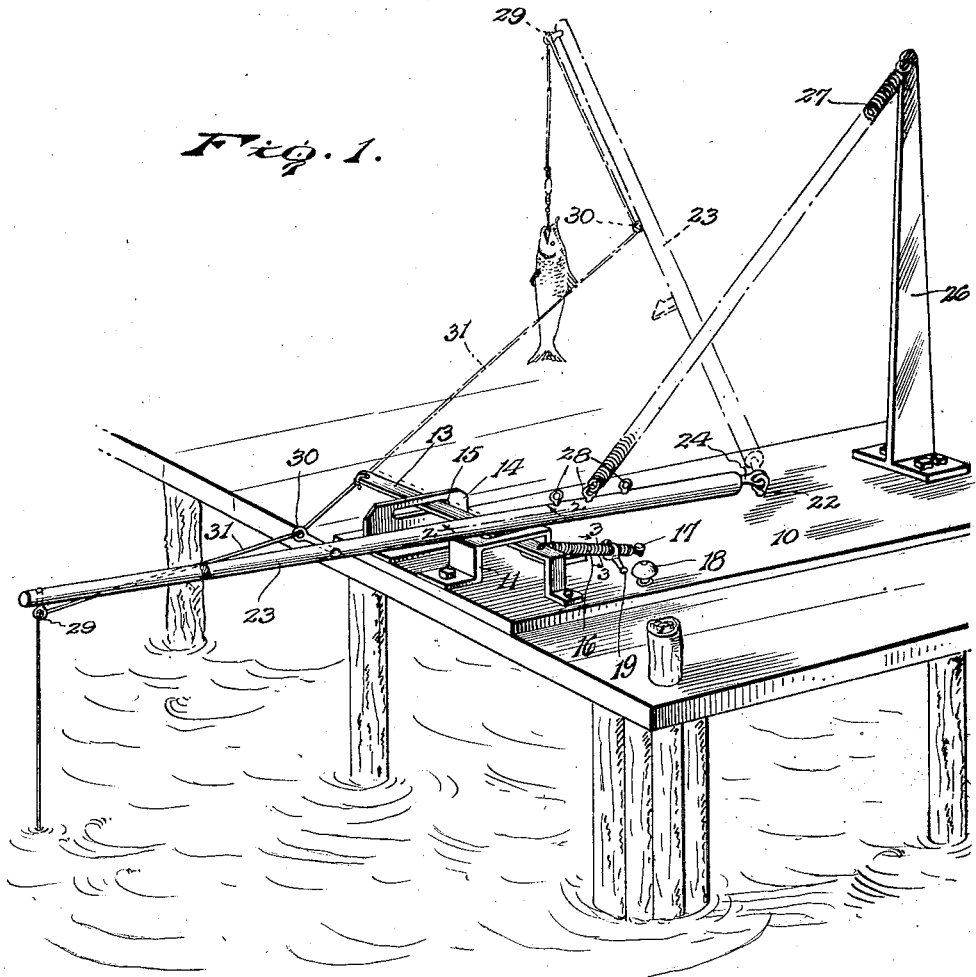
Figure 1 is a perspective view of my improved fishing device.

To set the device, the pole is, as shown in Figure 1, rocked forwardly to project the catch 25 through the slot 12 of the bracket 11 when, as brought out in Figure 2, the lever 13 is rocked rearwardly to engage the catch for holding the pole lowered against the tension of the spring 27, the device being arranged upon a wharf, as suggested in Figure 1, or upon the bank of a stream, so that the pole will project over the water for supporting the line 31 to extend therefrom into the water. Accordingly, as will be seen, the pull exerted upon the line by a fish biting at the bait carried by the hook at the free end of the line, will be communicated to the lever 13 for swinging said lever forwardly out of engagement with the catch 25 and releasing the pole, when the spring 27 will immediately function for swinging the pole upwardly, as suggested in dotted lines in Figure 1, to effect the catch. As will be observed, the pole is so mounted that the pole may partake considerably of a universal movement so that after the pole has been freed by the lever 13, movement of the fish in different directions in the water cannot serve to break the pole while the spring 27 will, of course, yieldably sustain the pole elevated and consequently cushion the pole against any violent strains. The spring 16 is provided in conjunction with the lever 13 in order that the fish will be permitted to effectually take the bait before the lever is swung to release the pole, to the end that when the pole is finally released, the fish will more than likely be hooked and, in this connection, it is to be noted that when the lever is swung for releasing the pole, the tapper 19 will be caused to strike the bell 18 for apprising the fisherman of the catch. I accordingly provide a particularly simple and efficient device for the purpose set forth and a device which, in use, may be easily carried from place to place to be located as may be considered most advantageous.

Having thus described the invention, what is claimed as new is:

1. A fishing device including a base, a bracket carried thereby and provided with a slot, a spring elevated pole pivoted upon the base and provided with a catch to extend through said slot when the pole is lowered, a trigger lever pivoted upon the base to extend beneath said bracket for engagement with the catch holding the pole lowered, and a line associated with the pole and connected to said lever.

2. A fishing device including a base, a spring elevated pole pivoted thereon and provided with a catch, a trigger lever pivoted upon the base and engageable with the catch for holding the pole lowered, a spring associated with the lever for yieldably holding the lever in engagement with the catch, and a line associated with the pole and connected to said lever.

3. A fishing device including a base, a spring elevated pole pivoted thereon and provided with a catch, a trigger lever pivoted upon the base and engageable with the catch for holding the pole lowered, a spring associated with the lever for yieldably holding the lever in engagement with the catch, a line associated with the pole and connected to said lever, an annunciator, and means associated with said spring for sounding the annunciator when the lever is swung for releasing the catch and freeing the pole.

4. A fishing device including a base, a bracket mounted thereon and provided with a slot, a trigger lever pivoted at one end upon the base to extend beneath said bracket, a guide member upstanding from the base and slotted to freely accommodate the free end portion of the lever therethrough, a pole pivoted upon the base and provided with a catch adapted to extend through the slot of said bracket engaged by the lever holding the pole lowered, a post upstanding from the base, a spring extending between said post and the pole and tensioned in the lowered position of the pole for exerting an upward pull thereon, and a line associated with the pole and connected with the free end of said lever.

In testimony whereof I affix my signature.

FELIX SAVOIE. [L. S.]